US012094408B2

(12) United States Patent
Yang et al.

(10) Patent No.: US 12,094,408 B2
(45) Date of Patent: Sep. 17, 2024

(54) DISPLAY DEVICE INCLUDING VOLTAGE GENERATOR FOR RECEIVING FEEDBACK DRIVING VOLTAGE

(71) Applicant: Samsung Display Co., Ltd., Yongin-si (KR)

(72) Inventors: Hyo-Sang Yang, Yongin-si (KR); Sungjin Kim, Cheonan-si (KR); Boram Shin, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 3 days.

(21) Appl. No.: 17/965,237

(22) Filed: Oct. 13, 2022

(65) Prior Publication Data

US 2023/0260456 A1 Aug. 17, 2023

(30) Foreign Application Priority Data

Feb. 16, 2022 (KR) ........................ 10-2022-0020345

(51) Int. Cl.

| | |
|---|---|
| ***G09G 3/32*** | (2016.01) |
| ***G09G 3/3233*** | (2016.01) |
| ***G09G 3/3275*** | (2016.01) |

(52) U.S. Cl.

CPC ......... *G09G 3/3233* (2013.01); *G09G 3/3275* (2013.01); *G09G 2300/0819* (2013.01); *G09G 2300/0842* (2013.01); *G09G 2310/0291* (2013.01); *G09G 2310/08* (2013.01); *G09G 2330/021* (2013.01); *G09G 2330/028* (2013.01)

(58) Field of Classification Search

CPC ............... G09G 3/3233; G09G 3/3275; G09G 2300/0819; G09G 2300/0842; G09G 2310/0291; G09G 2310/08; G09G 2330/021; G09G 2330/028

See application file for complete search history.

(56) References Cited

U.S. PATENT DOCUMENTS

| | | | | |
|---|---|---|---|---|
| 7,710,366 | B2 | 5/2010 | Lee et al. | |
| 11,069,721 | B2 | 7/2021 | Jung et al. | |
| 2010/0053056 | A1* | 3/2010 | Lee | G02F 1/1345 345/94 |
| 2017/0039955 | A1* | 2/2017 | Park | G09G 3/3233 |
| 2020/0090598 | A1* | 3/2020 | Sohn | G09G 3/3685 |
| 2021/0074216 | A1* | 3/2021 | Kim | G09G 3/3233 |
| 2021/0158752 | A1* | 5/2021 | Kang | G09G 3/3291 |

(Continued)

FOREIGN PATENT DOCUMENTS

| | | | |
|---|---|---|---|
| KR | 101142994 | B1 | 5/2012 |
| KR | 1020150123620 | A | 11/2015 |

(Continued)

*Primary Examiner* — Roy P Rabindranath

(74) *Attorney, Agent, or Firm* — CANTOR COLBURN LLP

(57) ABSTRACT

A display device includes: a display panel which receives a driving voltage and an initialization voltage; a power manager which provides the driving voltage to the display panel; and a voltage generator which receives a feedback driving voltage from the display panel and generates the initialization voltage based on the feedback driving voltage. The feedback driving voltage is a voltage that is fed back to the voltage generator after the driving voltage supplied from the power manager passes through the display panel.

20 Claims, 7 Drawing Sheets

(56) References Cited

U.S. PATENT DOCUMENTS

| | | | |
|---|---|---|---|
| 2021/0272515 | A1 | 9/2021 | Choi et al. |
| 2021/0280130 | A1 | 9/2021 | Wang et al. |

FOREIGN PATENT DOCUMENTS

| | | | |
|---|---|---|---|
| KR | 1020200033662 | A | 3/2020 |
| KR | 1020210111399 | A | 9/2021 |
| KR | 1020210111945 | A | 9/2021 |

* cited by examiner

DISPLAY DEVICE INCLUDING VOLTAGE GENERATOR FOR RECEIVING FEEDBACK DRIVING VOLTAGE

This application claims priority to Korean Patent Application No. 10-2022-0020345, filed on Feb. 16, 2022, and all the benefits accruing therefrom under 35 U.S.C. § 119, the content of which in its entirety is herein incorporated by reference

BACKGROUND

Embodiments of the present disclosure described herein relate to a display device.

An electronic device, which provides an image to a user, such as a smart phone, a digital camera, a notebook computer, a navigation system, a monitor, and a smart television, include a display device for displaying the image. The display device generates the image and provides the user with the generated image through a display screen.

The display device includes a plurality of pixels and driving circuits for controlling the plurality of pixels. Each of the plurality of pixels includes a light emitting element and a pixel circuit for controlling the light emitting element. The pixel circuit may include a plurality of transistors organically connected to one another.

The display device may apply a data signal to a display panel and may display a predetermined image as a current corresponding to the data signal is supplied to the light emitting element.

A desired image may be displayed by adjusting the amount of current supplied to the light emitting element. The pixel circuit may receive driving voltages to provide a current to the light emitting element.

SUMMARY

Embodiments of the present disclosure provide a display device capable of compensating for a voltage level change of a driving voltage according to an operating environment.

According to an embodiment, a display device includes: a display panel which receives a driving voltage and an initialization voltage, a power manager which provides the driving voltage to the display panel, and a voltage generator which receives a feedback driving voltage from the display panel and generates the initialization voltage based on the feedback driving voltage. The feedback driving voltage is a voltage that is fed back to the voltage generator after the driving voltage supplied from the power manager passes through the display panel.

In an embodiment, the display device may further include a flexible circuit film electrically connected to the display panel. The voltage generator may be disposed on the flexible circuit film.

In an embodiment, the display device may further include a main circuit board electrically connected to the flexible circuit film. The power manager may be disposed on the main circuit board.

In an embodiment, the flexible circuit film may further include a voltage line. The initialization voltage may be provided to the display panel through the voltage line of the flexible circuit film.

In an embodiment, the display device may further include a data driving circuit disposed on the flexible circuit film and for providing a data signal to the display panel.

In an embodiment, the voltage generator may include an operational amplifier including a first input terminal connected to a feedback voltage line for receiving the feedback driving voltage, a second input terminal connected to a first node, and an output terminal for outputting the initialization voltage, a first resistor between the output terminal and the first node, and a second resistor connected between the first node and a ground terminal.

In an embodiment, the voltage generator may include a first resistor connected between a feedback voltage line for receiving the feedback driving voltage and a first node, and a second resistor connected between the first node and a ground terminal. A voltage of the first node may be the initialization voltage.

In an embodiment, the display panel may include a plurality of pixels. At least one of the plurality of pixels may include a light emitting element including a first electrode and a second electrode for receiving the driving voltage and an initialization transistor connected between the first electrode of the light emitting element and an initialization voltage line. The initialization voltage line may receive the initialization voltage.

In an embodiment, the display panel may include a plurality of pixels. At least one of the plurality of pixels may include a first transistor including a first electrode electrically connected to a first voltage line, a second electrode, and a gate electrode, a second transistor connected between a data line and the first electrode of the first transistor, a third transistor connected between the second electrode of the first transistor and the gate electrode of the first transistor, and a light emitting element connected between the second electrode of the first transistor and a driving voltage line. The driving voltage line may receive the driving voltage.

In an embodiment, the display panel may include first pixels positioned in a first display area and second pixels positioned in a second display area. The display device may further include a first flexible circuit film electrically connected to the first pixels of the first display area and a second flexible circuit film electrically connected to the second pixels of the second display area.

In an embodiment, the voltage generator may include a first voltage generator disposed on the first flexible circuit film and which receives a first feedback driving voltage from the first pixels and generates a first initialization voltage and a second voltage generator disposed on the second flexible circuit film and which receives a second feedback driving voltage from the second pixels and generates a second initialization voltage. The first initialization voltage may be provided to the first pixels, and the second initialization voltage may be provided to the second pixels. The feedback driving voltage may include the first feedback driving voltage and the second feedback driving voltage, and the initialization voltage may include the first initialization voltage and the second initialization voltage.

According to an embodiment, a display device includes a display panel including first pixels positioned in a first display area and second pixels positioned in a second display area, a power manager which provides a driving voltage to the first pixels and the second pixels, a first voltage generator which receives a first feedback driving voltage from the first pixels and generates a first initialization voltage based on the first feedback driving voltage, and a second voltage generator which receives a second feedback driving voltage from the second pixels and generates a second initialization voltage based on the second feedback driving voltage. The first initialization voltage is provided to the first pixels, and the second initialization voltage is provided to the second pixels.

In an embodiment, the first feedback driving voltage may be a voltage that is fed back to the first voltage generator after the driving voltage supplied from the power manager passes through the first area of the display panel. The second feedback driving voltage may be a voltage that is fed back to the second voltage generator after the driving voltage supplied from the power manager passes through the second area of the display panel.

In an embodiment, the display device may further include a first flexible circuit film electrically connected to the first pixels of the first display area and a second flexible circuit film electrically connected to the second pixels of the second display area.

In an embodiment, the first voltage generator may be positioned on the first flexible circuit film, and the second voltage generator may be positioned on the second flexible circuit film.

In an embodiment, the display device may further include a first data driving circuit positioned on the first flexible circuit film and for providing a first data signal to the first pixels and a second data driving circuit positioned on the second flexible circuit film and for providing a second data signal to the second pixels.

In an embodiment, the first voltage generator may include a first operational amplifier including a first input terminal connected to a first feedback voltage line for receiving the first feedback driving voltage, a second input terminal connected to a first node, and an output terminal for outputting the first initialization voltage, a first resistor between the output terminal and the first node, and a second resistor connected between the first node and a ground terminal.

In an embodiment, the second voltage generator may include a second operational amplifier including a first input terminal connected to a second feedback voltage line for receiving the second feedback driving voltage, a second input terminal connected to a second node, and an output terminal for outputting the second initialization voltage, a third resistor connected between the output terminal and the second node, and a fourth resistor connected between the second node and the ground terminal.

In an embodiment, the first resistor and the third resistor may have different resistance values from each other. The second resistor and the fourth resistor may have different resistance values from each other.

In an embodiment, a voltage level of the first initialization voltage may be lower than or equal to the driving voltage. A voltage level of the second initialization voltage may be lower than or equal to the driving voltage.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
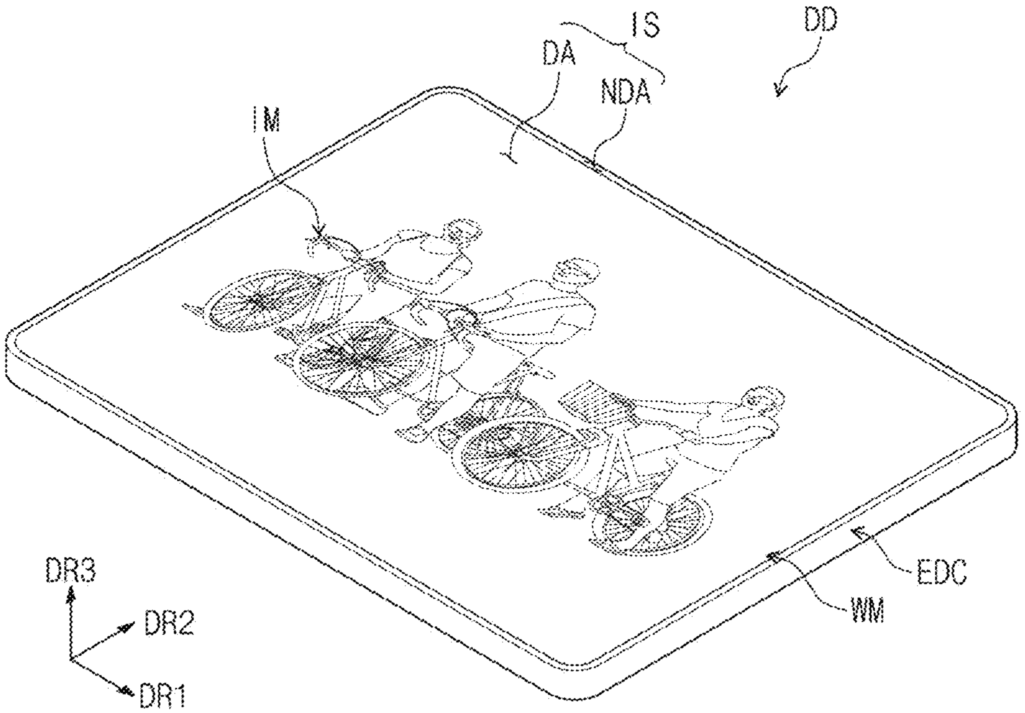
FIG. 1 is a perspective view of a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
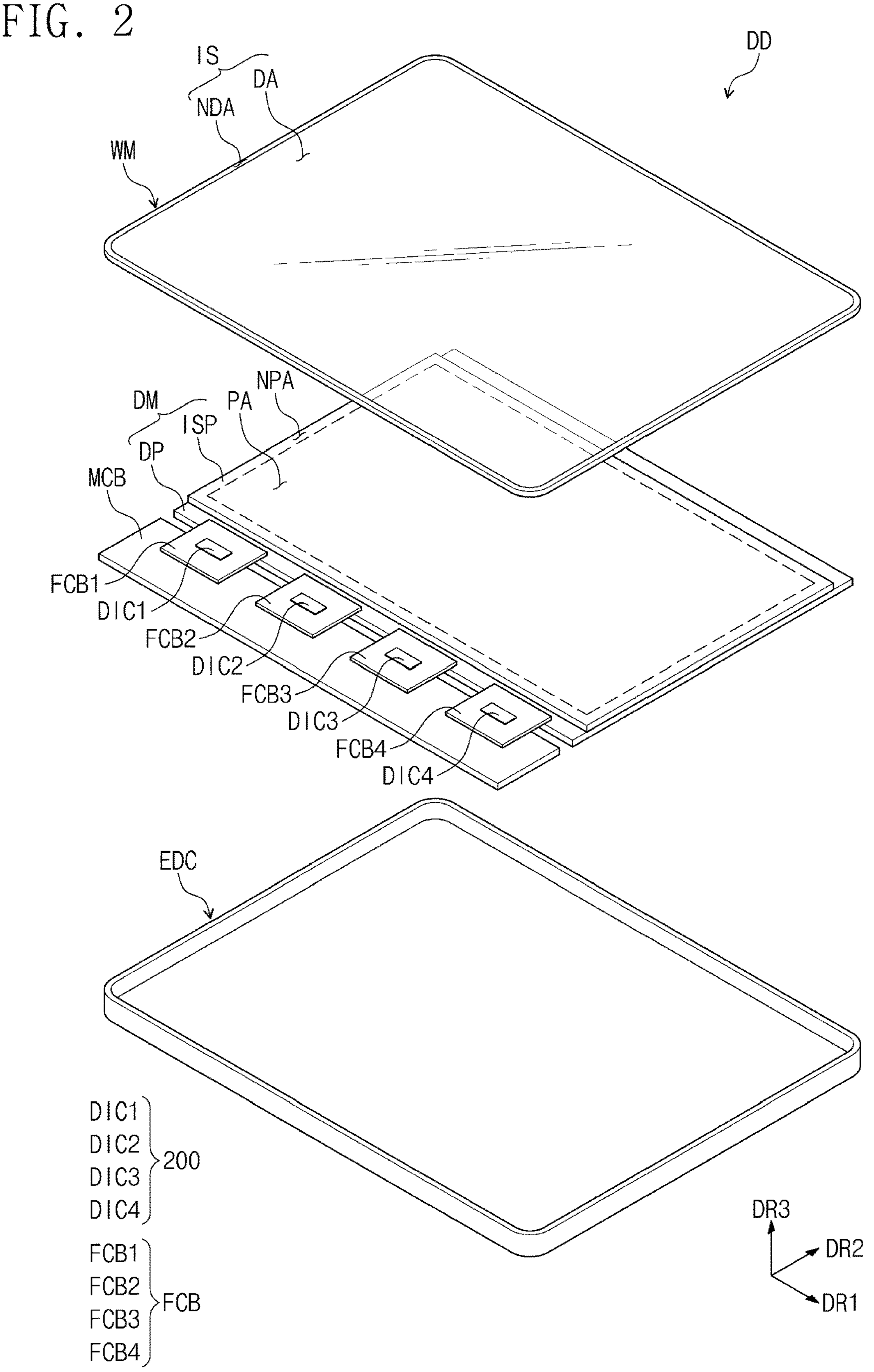
FIG. 2 is an exploded perspective view of a display device, according to an embodiment of the present disclosure.

FIG. 1 is a perspective view of a display device, according to an embodiment of the present disclosure. FIG. 2 is an exploded perspective view of a display device, according to an embodiment of the present disclosure.

Referring to FIGS. 1 and 2, a display device DD may be a device activated depending on an electrical signal. The display device DD according to the present disclosure may be a small and medium-sized electronic device, such as a mobile phone, a tablet PC, a notebook computer, a vehicle navigation system, or a game console, as well as a large-sized electronic device, such as a television or a monitor. The above examples are provided only as examples, and it is obvious that the display device DD may be applied to any other display device(s) without departing from the concept of the present disclosure. The display device DD is in a shape of a rectangle having a long side in a first direction DR1 and a short side in a second direction DR2 intersecting the first direction DR1. However, the shape of the display device DD is not limited thereto. For example, the display device DD may be implemented in various shapes. The display device DD may display an image IM on a display surface IS, which is parallel to each of the first direction DR1 and the second direction DR2, in a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, light, heat, his/her gaze, and pressure, or a combination thereof. Also, the display device DD may sense the external input of the user applied to a side surface or a rear surface of the display device DD depending on a structure of the display device DD and is not limited to an embodiment. As an example of the present disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. The user perceives (or views) the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is adjacent to the display area DA. The non-display area NDA may have a given color. The non-display area NDA may surround the display area DA. Accordingly, a shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to an embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include a light emitting display panel. For example, the display panel DP may be an organic light emitting display panel, an inorganic light emitting display panel, a quantum dot light emitting display panel. An emission layer of the organic light emitting display layer may include an organic light emitting material. An emission layer of the inorganic light emitting display panel may include an inorganic light emitting material. An emission layer of the quantum dot light emitting display panel may include a quantum dot, a quantum rod, or the like. Hereinafter, in an embodiment, the description will be given under the condition that the display panel DP is an organic light emitting display panel.

The display panel DP may output the image IM, and the image IM thus output may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of or include glass, sapphire, plastic, etc. It is illustrated that the window WM is implemented with a single layer. However, an embodiment is not limited thereto. For example, the window WM may include a plurality of layers in another embodiment.

Although not illustrated, the non-display area NDA of the display device DD described above may correspond to an area that is defined by printing a material including a given color on one area of the window WM. As an example of the present disclosure, the window WM may include a light blocking pattern for defining the non-display area NDA. The light blocking pattern that is a colored organic film may be formed, for example, in a coating manner.

The window WM may be coupled to the display module DM through an adhesive film. As an example of the present disclosure, the adhesive film may include an optically clear adhesive ("OCA") film. However, the adhesive film is not limited thereto. For example, the adhesive film may include a typical adhesive or sticking agent in another embodiment. For example, the adhesive film may include an optically clear resin ("OCR") or a pressure sensitive adhesive ("PSA") film in still another embodiment.

An anti-reflection layer may be further interposed between the window WM and the display module DM. The anti-reflection layer decreases the reflectivity of external light incident from above the window WM. The anti-reflection layer according to an embodiment of the present disclosure may include a retarder and a polarizer. The retarder may have a film type or a liquid crystal coating type. The polarizer may also have a film type or liquid crystal coating type. The film type may include a stretch-type synthetic resin film, and the liquid crystal coating type may include liquid crystals arranged in a given direction. The retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. Also, the anti-reflection layer may further include a light blocking pattern.

The display module DM may display the image IM depending on an electrical signal and may transmit/receive information about an external input. The display module DM may be defined as a pixel area PA and a peripheral area NPA. The pixel area PA may be defined as an area through which the image IM provided from the display area DA is output. Also, the pixel area PA may be defined as an area in which the input sensing layer ISP senses an external input applied from the outside.

The peripheral area NPA is adjacent to the pixel area PA. For example, the peripheral area NPA may surround the pixel area PA. However, this is illustrated by way of example. The peripheral area NPA may be defined in various shapes, not limited to an embodiment. According to an embodiment, the pixel area PA of the display module DM may correspond to at least part of the display area DA.

The display module DM may further include a main circuit board MCB, flexible circuit films FCB, and a data driving circuit 200. The main circuit board MCB may be connected to the flexible circuit films FCB to be electrically connected to the display panel DP. The flexible circuit films FCB are connected to the display panel DP to electrically connect the display panel DP to the main circuit board MCB. The main circuit board MCB may include a plurality of driving elements. The plurality of driving elements may include a circuit unit for driving the display panel DP. The data driving circuit 200 may be mounted on the flexible circuit films FCB.

As an example of the present disclosure, the flexible circuit films FCB may include a first flexible circuit film FCB1, a second flexible circuit film FCB2, a third flexible circuit film FCB3, and a fourth flexible circuit film FCB4. The data driving circuit 200 may include a first driver chip DIC1, a second driver chip DIC2, a third driver chip DIC3, and a fourth driver chip DIC4. The first to fourth flexible circuit films FCB1, FCB2, FCB3, and FCB4 may be positioned spaced from one another in the first direction DR1 and may be connected with the display panel DP so as to electrically connect the display panel DP and the main circuit board MCB. The first driver chip DIC1 may be mounted on the first flexible circuit film FCB1. The second driver chip DIC2 may be mounted on the second flexible circuit film FCB2. The third driver chip DIC3 may be mounted on the third flexible circuit film FCB3. The third driver chip DIC4 may be mounted on the third flexible circuit film FCB4. However, an embodiment of the present disclosure is not limited thereto. For example, the display panel DP may be electrically connected with the main circuit board MCB through one flexible circuit film, and only one driver chip may be mounted on the one flexible circuit film in another embodiment. Also, the display panel DP may be electrically connected with the main circuit board MCB through two or more flexible circuit films, and driver chips may be respectively mounted on the flexible circuit films.

A structure in which the first to fourth driver chips DIC1, DIC2, DIC3, and DIC4 are respectively mounted on the first to fourth flexible circuit films FCB1, FCB2, FCB3, and FCB4 is illustrated in FIG. 2, but the present disclosure is not limited thereto. For example, the first to fourth driver chips DIC1, DIC2, DIC3, and DIC4 may be directly mounted on the display panel DP in another embodiment. In this case, a portion of the display panel DP, on which the first to fourth driver chips DIC1, DIC2, DIC3, and DIC4 are mounted, may be bent such that the first to fourth driver chips DIC1, DIC2, DIC3, and DIC4 are disposed on a rear surface of the display module DM. Also, the first to fourth driver chips DIC1, DIC2, DIC3, and DIC4 may be directly mounted on the main circuit board MCB.

The input sensing layer ISP may be electrically connected with the main circuit board MCB through the flexible circuit films FCB. However, an embodiment of the present disclosure is not limited thereto. That is, the display module DM may additionally include a separate flexible circuit film for electrically connecting the input sensing layer ISP and the main circuit board MCB in another embodiment.

The display device DD further includes an outer case EDC accommodating the display module DM. The outer case EDC may be coupled to the window WM so as to define an exterior appearance of the display device DD. The outer case EDC may absorb external shocks and may prevent a foreign material/moisture or the like from being infiltrated into the display module DM such that components accommodated in the outer case EDC are protected. As an example of the present disclosure, the outer case EDC may be provided in the form of a combination of a plurality of accommodating members.

The display device DD according to an embodiment may further include an electronic module including various functional modules for operating the display module DM, a power supply module (e.g., a battery) for supplying a power for overall operations of the display device DD, a bracket coupled with the display module DM and/or the outer case EDC to partition an inner space of the display device DD, etc.

Figure 3:
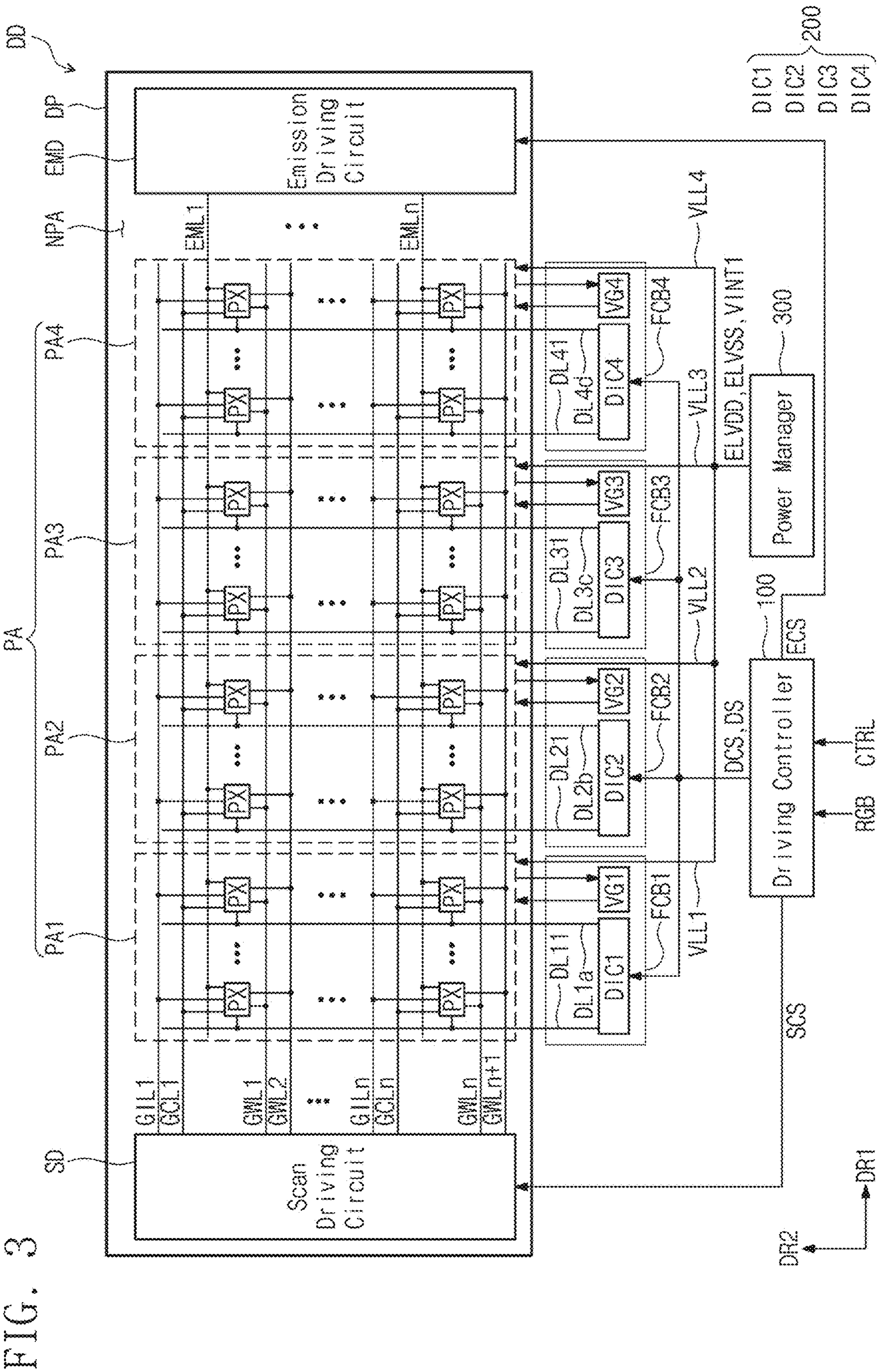
FIG. 3 is a block diagram of a display device, according to an embodiment of the present disclosure.

FIG. 3 is a block diagram of a display device, according to an embodiment of the present disclosure.

Referring to FIG. 3, the display device DD includes a driving controller 100, a data driving circuit 200, a power manager 300, and the display panel DP.

The driving controller 100 receives an input image signal RGB and a control signal CTRL. The driving controller 100 converts the input image signal RGB to an output image signal DS and provides the output image signal DS to the data driving circuit 200. The driving controller 100 outputs a scan control signal SCS, a data control signal DCS, and an emission driving signal ECS.

The data driving circuit 200 includes the first driver chip DIC1, the second driver chip DIC2, the third driver chip DIC3, and the fourth driver chip DIC4.

Each of the first driver chip DIC1, the second driver chip DIC2, the third driver chip DIC3, and the fourth driver chip DIC4 receives the data control signal DCS and the output image signal DS from the driving controller 100. Each of the first driver chip DIC1, the second driver chip DIC2, the third driver chip DIC3, and the fourth driver chip DIC4 converts the output image signal DS into data signals. Then, the first driver chip DIC1, the second driver chip DIC2, the third driver chip DIC3, and the fourth driver chip DIC4 output the converted data signals to a plurality of data lines DL11 to DL1*a*, DL21 to DL2*b*, DL31 to DL3*c*, and DL41 to DL4*d* to be described later, respectively. Each of the data signals may have a voltage level corresponding to the output image signal DS.

The display panel DP includes scan lines GIL1 to GILn, GCL1 to GCLn, and GWL1 to GWLn+1, emission control lines EML1 to EMLn, the data lines DL11 to DL1*a*, DL21 to DL2*b*, DL31 to DL3*c*, and DL41 to DL4*d*, and pixels PX. The display panel DP may further include a scan driving circuit SD and an emission driving circuit EMD. In an embodiment, the scan driving circuit SD is arranged on a first side of the display panel DP, and the emission driving circuit EMD is arranged on a second side of the display panel DP. In other words, the scan driving circuit SD and the emission driving circuit EMD are arranged to face each other with the pixels PX interposed therebetween. However, the present disclosure is not limited thereto. In another embodiment, the scan driving circuit SD and the emission driving circuit EMD may be arranged side by side on the first side of the display panel DP.

The scan lines GIL1 to GILn, GCL1 to GCLn, and GWL1 to GWLn+1 extend from the scan driving circuit SD in the first direction DR1. The emission control lines EML1 to EMLn extend from the emission driving circuit EMD in a direction opposite to the first direction DR1.

The display panel DP may be divided into a pixel area PA and a peripheral area NPA. The pixels PX may be positioned in the pixel area PA. The scan driving circuit SD and the emission driving circuit EMD may be positioned in the peripheral area NPA.

The pixel area PA may be divided into first to fourth pixel areas PA1, PA2, PA3, and PA4. The first to fourth driver chips DIC1, DIC2, DIC3, and DIC4 may correspond to the first to fourth pixel areas PA1, PA2, PA3, and PA4, respectively. That is, the first driver chip DIC1 may drive the pixels PX positioned in the first pixel area PA1; the second driver chip DIC2 may drive the pixels PX positioned in the second pixel area PA2; the third driver chip DIC3 may drive the pixels PX positioned in the third pixel area PA3; and, the fourth driver chip DIC4 may drive the pixels PX positioned in the fourth pixel area PA4.

The plurality of pixels PX are electrically connected to the scan lines GIL1 to GILn, GCL1 to GCLn, and GWL1 to GWLn+1, the emission control lines EML1 to EMLn, and the data lines DL11 to DL1*a*, DL21 to DL2*b*, DL31 to DL3*c*, and DL41 to DL4*d*. For example, a first row of pixels may be connected to the scan lines GIL1, GCL1, GWL1, and GWL2 and the emission control line EML1. Furthermore, the j-th row of pixels may be connected to the scan lines GILj, GCLj, GWLj, and GWLj+1 and the emission control line EMLj. Each of the plurality of pixels PX includes a light emitting element ED (see FIG. 5) and a pixel circuit PXC (see FIG. 5) for controlling the light emission of the light emitting element ED. The pixel circuit PXC may include a plurality of transistors and at least one capacitor.

Each of the plurality of pixels PX receives a first driving voltage ELVDD, a second driving voltage ELVSS, and a first initialization voltage VINT1.

The scan driving circuit SD receives the scan control signal SCS from the driving controller 100. The scan driving circuit SD may output scan signals to the scan lines GIL1 to GILn, GCL1 to GCLn, and GWL1 to GWLn+1 in response to the scan control signal SCS. The scan driving circuit SD may include transistors formed through the same process as the pixel circuit PXC.

The emission driving circuit EMD receives the emission driving signal ECS from the driving controller 100. The scan driving circuit SD may output emission control signals to the emission control lines EML1 to EMLn in response to the emission driving signal ECS. The emission driving circuit EMD may include transistors formed through the same process as the pixel circuit PXC.

The power manager 300 generates voltages to operate the display panel DP. In an embodiment, the power manager 300 generates the first driving voltage ELVDD, the second driving voltage ELVSS, and the first initialization voltage VINT1, which are for an operation of the display panel DP. The first driving voltage ELVDD, the second driving voltage ELVSS, and the first initialization voltage VINT1 may be provided to the display panel DP through voltage lines VLL1, VLL2, VLL3, and VLL4. The voltage lines VLL1, VLL2, VLL3, and VLL4 may electrically connect the power manager 300 and the display panel DP via the first to fourth flexible circuit films FCB1, FCB2, FCB3, and FCB4.

As well as the first driving voltage ELVDD, the second driving voltage ELVSS, and the first initialization voltage VINT1, the power manager 300 may further generate various voltages for operations of the display panel DP and the scan driving circuit SD.

In an embodiment, the driving controller 100 and the power manager 300 may be implemented as integrated circuits, respectively, and may be mounted on the main circuit board MCB shown in FIG. 1. In an embodiment, the driving controller 100 may be positioned in one of the first to fourth flexible circuit films FCB1, FCB2, FCB3, and FCB4.

The display device DD may further include first to fourth voltage generators VG1, VG2, VG3, and VG4. In an embodiment, the first to fourth voltage generators VG1, VG2, VG3, and VG4 may be positioned in the first to fourth flexible circuit films FCB1, FCB2, FCB3, and FCB4, respectively.

Each of the first to fourth voltage generators VG1, VG2, VG3, and VG4 may correspond to the first to fourth pixel areas PA1, PA2, PA3, and PA4. The circuit configuration and operation of each of the first to fourth voltage generators VG1, VG2, VG3, and VG4 will be described in detail below.

Figure 4:
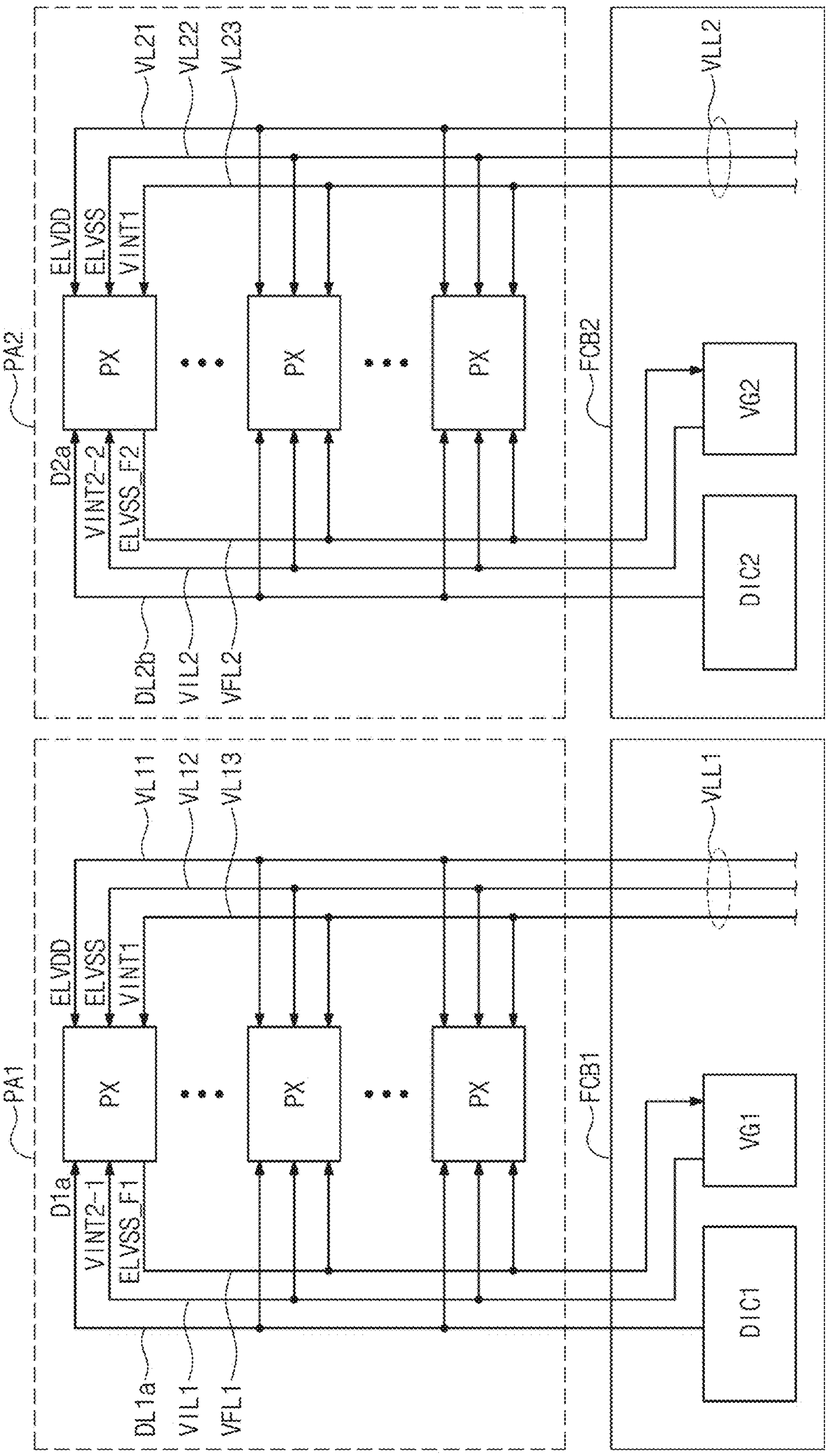
FIG. 4 is a view illustrating a first flexible circuit film, a second flexible circuit film, and some pixels shown in FIG. 3.

FIG. 4 is a view illustrating a first flexible circuit film, a second flexible circuit film, and some pixels shown in FIG. 3.

Referring to FIG. 4, the first driver chip DIC1 and the first voltage generator VG1 may be disposed on the first flexible circuit film FCB1.

The voltage line VLL1 includes a first voltage line VL11, a second voltage line VL12, and a third voltage line VL13. The first voltage line VL11, the second voltage line VL12, and the third voltage line VL13 may deliver the first driving voltage ELVDD, the second driving voltage ELVSS, and the first initialization voltage VINT1 to the pixels PX positioned in the first pixel area PA1, respectively.

The first voltage line VL11, the second voltage line VL12, and the third voltage line VL13 may be commonly connected to the pixels PX positioned in the first pixel area PA1.

An initialization voltage line VIL1 and a feedback voltage line VFL1 are connected between the pixels PX positioned in the first pixel area PA1 and the first voltage generator VG1. The initialization voltage line VIL1 delivers a second initialization voltage VINT2-1 from the first voltage generator VG1 to the pixels PX positioned in the first pixel area PA1. The feedback voltage line VFL1 may deliver a feedback driving voltage ELVSS_F1 from the pixels PX positioned in the first pixel area PA1 to the first voltage generator VG1.

The first voltage generator VG1 may receive the feedback driving voltage ELVSS_F1 from the pixels PX positioned in the first pixel area PA1 and may output the second initialization voltage VINT2-1 corresponding to a voltage level of the feedback driving voltage ELVSS_F1.

In an embodiment, the second initialization voltage VINT2-1 may be a voltage lower than or equal to the feedback driving voltage ELVSS_F1. When the voltage level of the second initialization voltage VINT2-1 is set to be the same as a voltage level of the feedback driving voltage ELVSS_F1, the first voltage generator VG1 may receive the feedback driving voltage ELVSS_F1 and may output the feedback driving voltage ELVSS_F1 as the second initialization voltage VINT2-1. When the voltage level of the second initialization voltage VINT2-1 is lower than a voltage level of the feedback driving voltage ELVSS_F1, the configuration and operation of the first voltage generator VG1 will be described with reference to FIGS. 7 and 8.

The second driver chip DIC2 and the second voltage generator VG2 may be positioned on the second flexible circuit film FCB2.

The voltage line VLL2 includes a first voltage line VL21, a second voltage line VL22, and a third voltage line VL23. The first voltage line VL21, the second voltage line VL22, and the third voltage line VL23 may deliver the first driving voltage ELVDD, the second driving voltage ELVSS, and the first initialization voltage VINT1 to the pixels PX positioned in the second pixel area PA2, respectively.

The first voltage line VL21, the second voltage line VL22, and the third voltage line VL23 may be commonly connected to the pixels PX positioned in the second pixel area PA2.

An initialization voltage line VIL2 and a feedback voltage line VFL2 are connected between the pixels PX positioned in the second pixel area PA2 and the second voltage generator VG2. The initialization voltage line VIL2 delivers a second initialization voltage VINT2-2 from the second voltage generator VG2 to the pixels PX positioned in the second pixel area PA2. The feedback voltage line VFL2 may deliver a feedback driving voltage ELVSS_F2 from the pixels PX positioned in the second pixel area PA2 to the second voltage generator VG2.

The second voltage generator VG2 may receive the feedback driving voltage ELVSS_F2 from the pixels PX positioned in the second pixel area PA2 and may output the second initialization voltage VINT2-2 corresponding to a voltage level of the feedback driving voltage ELVSS_F2.

In an embodiment, the second initialization voltage VINT2-2 may be a voltage lower than or equal to the feedback driving voltage ELVSS_F2. When the voltage level of the second initialization voltage VINT2-2 is set to be the same as a voltage level of the feedback driving voltage ELVSS_F2, the second voltage generator VG2 may receive the feedback driving voltage ELVSS_F2 and may output the feedback driving voltage ELVSS_F2 as the second initialization voltage VINT2-2.

When the voltage level of the second initialization voltage VINT2-2 is lower than a voltage level of the feedback driving voltage ELVSS_F2, the configuration and operation of the second voltage generator VG2 will be described with reference to FIGS. 7 and 8.

FIG. 4 shows only the first flexible circuit film FCB1 corresponding to the first pixel area PA1 and the second flexible circuit film FCB2 corresponding to the second pixel area PA2. The third flexible circuit film FCB3 or the fourth flexible circuit film FCB4 shown in FIG. 3 may also have a circuit configuration similar to that of the first flexible circuit film FCB1 or the second flexible circuit film FCB2 and may operate similarly.

Figure 5:
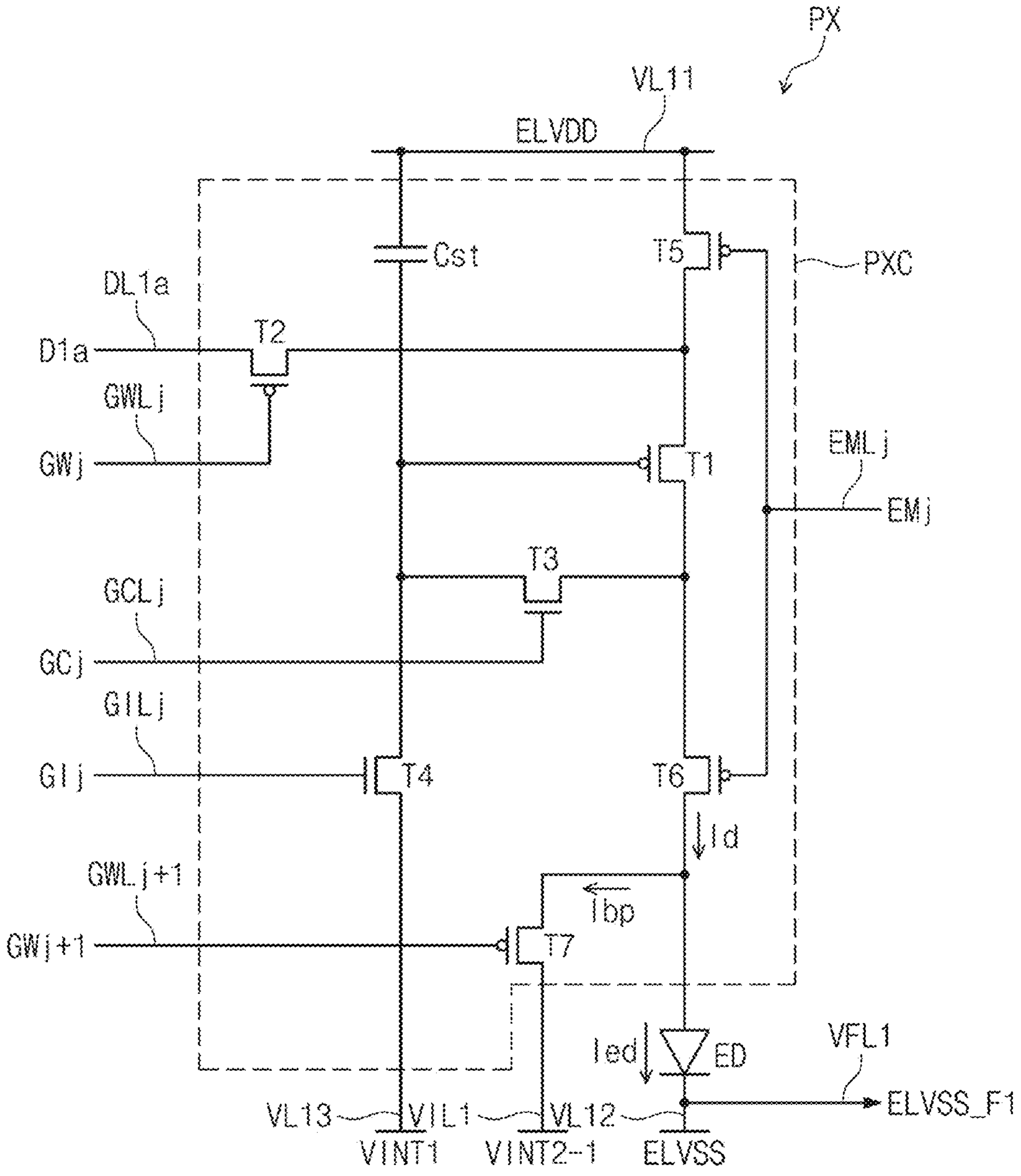
FIG. 5 is a circuit diagram of a pixel, according to an embodiment of the present disclosure.

FIG. 5 is a circuit diagram of a pixel, according to an embodiment of the present disclosure.

FIG. 5 shows the pixel PX positioned in the first pixel area PA1 among the pixels PX shown in FIG. 3. The pixel PX shown in FIG. 5 is connected to the data line DL1*a*, the scan lines GILj, GCLj, GWLj, and GWLj+1, and the emission control line EMLj.

Referring to FIG. 5, the pixel PX of a display device according to an embodiment includes the pixel circuit PXC and the at least one light emitting element ED. In an embodiment, the light emitting element ED may be a light emitting diode. In an embodiment, it is described that the one pixel PX includes the one light emitting element ED. The pixel circuit PXC includes first to seventh transistors T1, T2, T3, T4, T5, T6, and T7 and a capacitor Cst.

In an embodiment, the third and fourth transistors T3 and T4 among the first to seventh transistors T1 to T7 are N-type transistors by using an oxide semiconductor as a semiconductor layer. Each of the first, second, fifth, sixth, and seventh transistors T1, T2, T5, T6, and T7 is a P-type transistor having a low-temperature polycrystalline silicon ("LTPS") semiconductor layer. However, the present disclosure is not limited thereto. For example, all of the first to seventh transistors T1 to T7 may be P-type transistors or N-type transistors in another embodiment. In still another embodiment, at least one of the first to seventh transistors T1 to T7 may be an N-type transistor, and the other(s) thereof may be P-type transistors. Moreover, a circuit configuration of the pixel PX according to an embodiment of the present disclosure is not limited to an embodiment in FIG. 5. The pixel PX illustrated in FIG. 5 is only an example, and the circuit configuration of the pixel PX may be modified and implemented.

The scan lines GILj, GCLj, GWLj, and GWLj+1 may deliver scan signals GIj, GCj, GWj, and GWj+1, respectively, and the emission control line EMLj may deliver an emission control signal EMj. A data line DL1*a* delivers a data signal D1*a*. The data signal D1*a* may have a voltage level corresponding to the image signal RGB input to the display device DD (see FIG. 3). The first to third voltage lines VL11, VL12, and VL13 may deliver the first driving voltage ELVDD, the second driving voltage ELVSS, and the first initialization voltage VINT1, respectively. The initialization voltage line VIL1 may deliver the second initialization voltage VINT2-1. The feedback voltage line VFL1 may deliver the feedback driving voltage ELVSS_F1 to the outside of the pixel PX.

The first transistor T1 includes a first electrode connected with the first voltage line VL11 via the fifth transistor T5, a second electrode electrically connected with an anode (or a first electrode) of the light emitting element ED via the sixth transistor T6, and a gate electrode connected with a first end of the capacitor Cst. The first transistor T1 may receive the data signal D1*a* through the data line DL1*a* depending on a switching operation of the second transistor T2 and may supply a driving current Id to the light emitting element ED.

The second transistor T2 includes a first electrode connected to the data line DL1*a*, a second electrode connected to the first electrode of the first transistor T1, and a gate electrode connected to the scan line GWLj. The second transistor T2 may be turned on in response to the scan signal GWj received through the scan line GWLj and may deliver the data signal D1*a* delivered through the data line DL1*a* to the first electrode of the first transistor T1.

The third transistor T3 includes a first electrode connected with the gate electrode of the first transistor T1, a second electrode connected with the second electrode of the first transistor T1, and a gate electrode connected with the scan line GCLj. The third transistor T3 may be turned on in response to the scan signal GCj transferred through the scan line GCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third voltage line VL13 through which the first initialization voltage VINT1 is supplied, and a gate electrode connected to the scan line GILj. The fourth transistor T4 may be turned on in response to the scan signal GIj transferred through the scan line GILj such that the first initialization voltage VINT1 is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first voltage line VL11, a second electrode connected to the first electrode of the first transistor T1, and a gate electrode connected to the emission control line EMLj.

The sixth transistor T6 includes a first electrode connected with the second electrode of the first transistor T1, a second electrode connected with the anode of the light emitting element ED, and a gate electrode connected with the emission control line EMLj.

The fifth transistor T5 and the sixth transistor T6 may be simultaneously turned on in response to the emission control signal EMj transferred through the emission control line EMLj. As such, the first driving voltage ELVDD may be compensated for through the diode-connected transistor T1 so as to be supplied to the light emitting element ED.

The seventh transistor T7 includes a first electrode connected with the second electrode of the sixth transistor T6, a second electrode connected with the initialization voltage line VIL1, and a gate electrode connected with the scan line GWLj+1. The seventh transistor T7 is turned on in response to the scan signal GWj+1 transferred through the scan line GWLj+1 and bypasses a current Ibp of the anode of the light emitting element ED to the initialization voltage line VIL1. The seventh transistor T7 may be an initialization transistor that initializes the anode of the light emitting element ED.

The first end of the capacitor Cst is connected with the gate electrode of the first transistor T1 as described above, and a second end of the capacitor Cst is connected with the first voltage line VL11. A cathode (or a second electrode) of the light emitting element ED may be connected to the second voltage line VL12 for delivering the second driving voltage ELVSS and the feedback voltage line VFL1 for delivering the feedback driving voltage ELVSS_F1.

In an embodiment, each of the pixels PX positioned in the first pixel area PA1 may be directly connected to the feedback voltage line VFL1. In an embodiment, only one or a part of the pixels PX positioned in the first pixel area PA1 may be directly connected to the feedback voltage line VFL1. Likewise, only one or a part of the pixels PX positioned in the second pixel area PA2 may be directly connected to the feedback voltage line VFL2.

Figure 6:
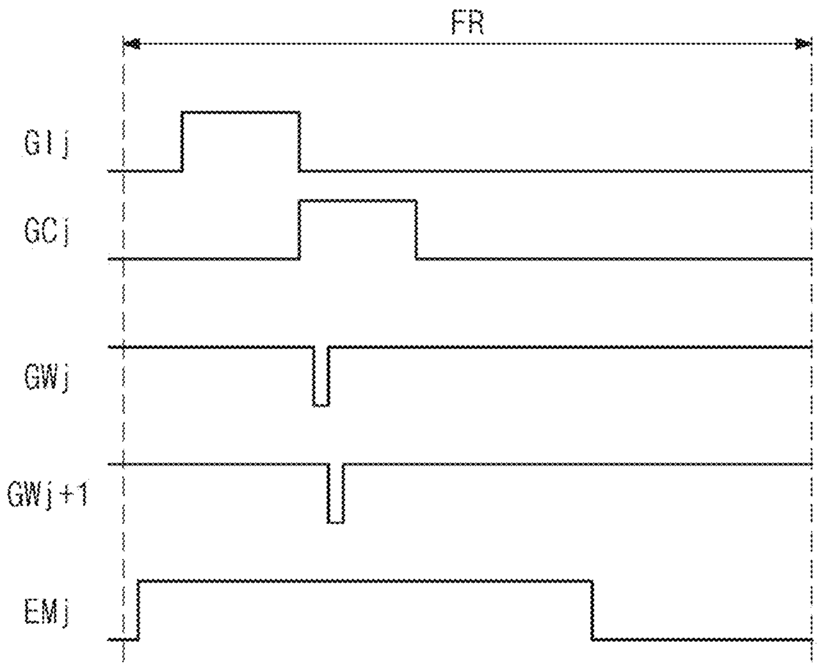
FIG. 6 is a timing diagram for describing an operation of a pixel illustrated in FIG. 5.

FIG. 6 is a timing diagram for describing an operation of a pixel illustrated in FIG. 5.

Referring to FIGS. 5 and 6, the scan signal GIj having a high level is provided through the scan line GILj during an initialization interval within a frame FR. When the fourth transistor T4 is turned on in response to the scan signal GIj having a high level, the first initialization voltage VINT1 is supplied to the gate electrode of the first transistor T1 through the fourth transistor T4 so as to initialize the first transistor T1.

Next, when the scan signal GCj having a high level is supplied through the scan line GCLj during a data programming and compensation interval, the third transistor T3 is turned on. The first transistor T1 is diode-connected by the third transistor T3 thus turned on to be forward-biased. At this time, when the scan signal GWj having a low level is supplied through the scan line GWLj, the second transistor T2 is turned on. In the case, a compensation voltage, which is obtained by reducing the voltage of the data signal D1*a* supplied from the data line DL1*a* by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are respectively applied to opposite ends of the capacitor Cst, a charge corresponding to a difference between the first driving voltage ELVDD and the compensation voltage may be stored in the capacitor Cst.

In the meantime, the seventh transistor T7 is turned on in response to the scan signal GWj+1 having a low level that is delivered through the scan line GWLj+1. A part of the driving current Id may be drained through the seventh transistor T7 as the bypass current Ibp.

When the light emitting element ED emits light under the condition that a minimum current of the first transistor T1 flows as a driving current for the purpose of displaying a black image, the black image may not be normally displayed. Accordingly, the seventh transistor T7 in the pixel PXij according to an embodiment of the present disclosure may drain (or disperse) a part of the minimum current of the first transistor T1 to a current path, which is different from a current path to the light emitting element ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current (e.g., a current of 10 picoamperes (pA) or less) is delivered to the light emitting element ED, with the first transistor T1 turned off, an image of black luminance is expressed. When the minimum driving current for displaying a black image flows, the influence of a bypass transfer of the bypass current Ibp may be great; in contrast, when a large driving current for displaying an image such as a normal image or a white image flows, there may be almost no influence of the bypass current Ibp. Accordingly, when a driving current for displaying a black image flows, a light emitting current Ted of the light emitting element ED, which corresponds to a result of subtracting the bypass current Ibp drained through the sixth transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GWj+1 having a low level, but is not necessarily limited thereto.

To sufficiently initialize the anode of the light emitting element ED, the voltage level of the second initialization voltage VINT2-1 is desirable to be set to an appropriate level. In particular, the voltage level of the second initialization voltage VINT2-1 is desirable to be determined depending on the voltage level of the second driving voltage ELVSS. In an embodiment, the voltage level of the second initialization voltage VINT2-1 may be determined to be equal to or lower than the second driving voltage ELVSS.

After the anode of the light emitting element ED is initialized, the emission control signal EMj supplied from the emission control line EMLj is changed from a high level to a low level during a light emitting interval. During the light emitting interval, the fifth transistor T5 and the sixth transistor T6 are turned on by the emission control signal EMj having a low level. In this case, the driving current Id according to a voltage difference between the gate voltage of the gate electrode of the first transistor T1 and the first driving voltage ELVDD is generated and supplied to the light emitting element ED through the sixth transistor T6, and the current led flows through the light emitting element ED.

Returning to FIG. 4, in an embodiment, the first voltage generator VG1 generates the second initialization voltage VINT2-1, and the second voltage generator VG2 generates the second initialization voltage VINT2-2.

In another embodiment, the power manager 300 shown in FIG. 3 generates a second initialization voltage instead of the voltage generators VG1 to VG4, as with the first driving voltage ELVDD, the second driving voltage ELVSS and the first initialization voltage VINT1, the second initialization voltage from the power manager 300 may be commonly provided to the pixels PX of the first to fourth pixel areas PA1, PA2, PA3, and PA4.

In this embodiment, even though the power manager 300 provides one second initialization voltage to the pixels PX in the first to fourth pixel areas PA1, PA2, PA3, and PA4, voltage levels of the second initialization voltage received by the pixels PX in the first to fourth pixel areas PA1, PA2, PA3, and PA4 may be different from one another. The reason is caused by a difference in connection resistance between the display panel DP and each of the first to fourth flexible circuit films FCB1, FCB2, FCB3, and FCB4, a difference in wiring resistance according to a wiring length, or a difference in voltage drop between the pixels PX in the first to fourth pixel areas PA1, PA2, PA3, and PA4.

In this embodiment, when the voltage levels of the second initialization voltage received by the pixels PX in the first to fourth pixel areas PA1, PA2, PA3, and PA4 are different from one another, the difference between the voltage levels may cause the anodes of the light emitting elements ED in the first to fourth pixel areas PA1, PA2, PA3, and PA4 to be initialized at different initialization voltage levels. In this case, a difference in luminance between the first to fourth pixel areas PA1, PA2, PA3, and PA4 may be visually perceived by the user.

The second driving voltage ELVSS provided from the power manager 300 shown in FIG. 3 may be provided to the pixels PX in the first pixel area PA1 through the voltage line VLL1 (i.e., the second voltage line VL2) on the first flexible circuit film FCB1. The second driving voltage ELVSS provided by the pixels PX within the first pixel area PA1 may be delivered to the first voltage generator VG1 as the feedback driving voltage ELVSS_F1 after the second driving voltage ELVSS from the power manager 300 passes through the pixels PX within the first pixel area PA1.

In an embodiment, the first voltage generator VG1 outputs the second initialization voltage VINT2-1 based on the feedback driving voltage ELVSS_F1 received from the pixels PX in the first pixel area PA1. The second initialization voltage VINT2-1 may be provided to the pixels PX in the first pixel area PA1.

In this embodiment, the second driving voltage ELVSS received by the pixels PX in the first pixel area PA1 may have a voltage level different from a voltage level of the second driving voltage ELVSS provided from the power manager 300 due to the connection resistance between the display panel DP and the first flexible circuit film FCB1, wire resistance according to a wire length of the second voltage line VL2, or a voltage drop at the pixels PX in the first pixel area PA1.

In an embodiment, the first voltage generator VG1 outputs the second initialization voltage VINT2-1 based on the feedback driving voltage ELVSS_F1, and thus the pixels PX in the first pixel area PA1 may receive the second initialization voltage VINT2-1 corresponding to the second driving voltage ELVSS received through the cathode of the light emitting element ED.

In this embodiment, the second voltage generator VG2 outputs the second initialization voltage VINT2-2 based on the feedback driving voltage ELVSS_F2 received from the pixels PX in the second pixel area PA2, and thus the pixels PX in the second pixel area PA2 may receive the second initialization voltage VINT2-2 corresponding to the second driving voltage ELVSS received through the cathode of the light emitting element ED.

In other words, in this embodiment, the pixels PX in the first pixel area PA1 receive the second initialization voltage VINT2-1, and the pixels PX in the second pixel area PA2 receive the second initialization voltage VINT2-2. Accordingly, the pixels PX in the first pixel area PA1 and the pixels PX in the second pixel area PA2 may receive an optimal second initialization voltages VINT2-1 and VINT2-2, respectively, compared to the case that the power manager 300 provides the same second initialization voltage to the pixels PX in the first to fourth pixel areas PA1, PA2, PA3, and PA4 commonly.

Figure 7:
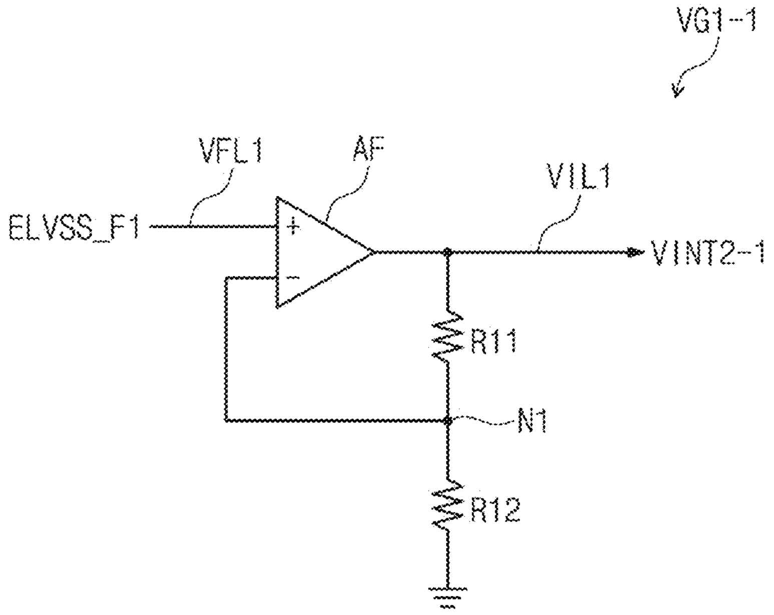
FIG. 7 is a circuit diagram of a first voltage generator, according to an embodiment of the present disclosure.

FIG. 7 is a circuit diagram of a first voltage generator, according to an embodiment of the present disclosure.

The first voltage generator VG1 illustrated in FIG. 4 may include a circuit configuration of a first voltage generator VG1-1 illustrated in FIG. 7.

Referring to FIGS. 4 and 7, the first voltage generator VG1-1 includes an operational amplifier AF and resistors R11 and R12.

The operational amplifier AF includes a first input terminal (+), a second input terminal (−), and an output terminal. The first input terminal (+) is connected to the feedback voltage line VFL1, and the second input terminal (−) is connected to a first node N1.

The resistor R11 is connected between the initialization voltage line VIL1 and the first node N1. The resistor R12 is connected between the first node N1 and a ground terminal.

The first voltage generator VG1-1 may receive the feedback driving voltage ELVSS_F1 through the first input terminal (+) and may output the second initialization voltage VINT2-1 through the initialization voltage line VIL1.

The voltage level of the second initialization voltage VINT2-1 may be selected by setting a resistance value of each of the resistors R11 and R12.

In an embodiment, a voltage level of the second initialization voltage VINT2-1 output from the first voltage generator VG1-1 may be lower than a voltage level of the feedback driving voltage ELVSS_F1.

In an embodiment, the first voltage generator VG1-1 may be a non-inverting amplifier. However, a circuit configuration of the first voltage generator VG1-1 is not limited to the example shown in FIG. 7. The circuit configuration of the first voltage generator VG1-1 may be variously changed. Each of the first to fourth voltage generators VG1, VG2, VG3, and VG4 illustrated in FIG. 3 may include a circuit configuration similar to that of the first voltage generator VG1-1 illustrated in FIG. 7.

In each of the first to fourth voltage generators VG1, VG2, VG3, and VG4, resistance values of the resistors R11 and R12 shown in FIG. 7 may be set differently from each other. For example, the resistor R11 of the first voltage generator VG1 and the resistor R11 of the second voltage generator VG2 may have different values from each other. Moreover, the resistor R12 of the first voltage generator VG1 and the resistor R12 of the second voltage generator VG2 may have different values from each other.

Figure 8:
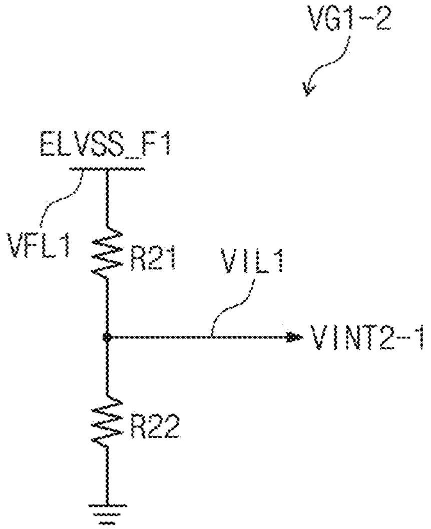
FIG. 8 is a circuit diagram of a first voltage generator, according to another embodiment of the present disclosure.

FIG. 8 is a circuit diagram of a first voltage generator, according to another embodiment of the present disclosure.

The first voltage generator VG1 illustrated in FIG. 4 may include a circuit configuration of a first voltage generator VG1-2 illustrated in FIG. 8.

Referring to FIGS. 4 and 8, the first voltage generator VG1-2 includes resistors R21 and R22.

The resistor R21 is connected between the feedback voltage line VFL1 and the initialization voltage line VIL1. The resistor R22 is connected between the initialization voltage line VIL1 and the ground terminal.

The first voltage generator VG1-2 may receive the feedback driving voltage ELVSS_F1 from the feedback voltage line VFL1 and may output the second initialization voltage VINT2-1 through the initialization voltage line VIL1.

The voltage level of the second initialization voltage VINT2-1 may be selected by setting a resistance value of each of the resistors R21 and R22.

In an embodiment, a voltage level of the second initialization voltage VINT2-1 output from the first voltage generator VG1-2 may be lower than a voltage level of the feedback driving voltage ELVSS_F1.

The first voltage generator VG1-2 includes only two resistors R21 and R22. However, the circuit configuration of the first voltage generator VG1-2 is not limited to the example shown in FIG. 8. The circuit configuration of the first voltage generator VG1-2 may be variously changed.

Each of the first to fourth voltage generators VG1, VG2, VG3, and VG4 illustrated in FIG. 3 may include a circuit configuration similar to that of the first voltage generator VG1-2 illustrated in FIG. 8.

In an embodiment, in each of the first to fourth voltage generators VG1, VG2, VG3, and VG4, resistance values of the resistors R21 and R22 shown in FIG. 8 may be set differently from each other. For example, the resistor R21 of the first voltage generator VG1 and the resistor R21 of the second voltage generator VG2 may have different values from each other. Moreover, the resistor R22 of the first voltage generator VG1 and the resistor R22 of the second voltage generator VG2 may have different values from each other.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

When a voltage level of a second driving voltage (e.g., ELVSS) is changed depending on an operating environment, a display device having such a configuration may change a voltage level of an initialization voltage (e.g., the second initialization voltage VINT2-1) for initializing a light emitting element depending on a voltage level of the changed second driving voltage. Accordingly, it is possible to prevent the display quality of a display device from deteriorating, by changing the voltage level of the initialization voltage in conjunction with the voltage level change of the second driving voltage.

As used in connection with various embodiments of the disclosure, each of the driving controller 100, the power manager 300, and the voltage generators VG1 to VG4 may be implemented in hardware, software, or firmware, for example, implemented in a form of an application-specific integrated circuit (ASIC) or circuits.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel, which receives a driving voltage and an initialization voltage;

a power manager, which provides the driving voltage to the display panel; and a voltage generator, which receives a feedback driving voltage from the display panel and generates the initialization voltage based on the feedback driving voltage, wherein the voltage generator increases the initialization voltage when the feedback driving voltage increases and decreases the initialization voltage when the feedback driving voltage decreases, wherein the feedback driving voltage is a voltage that is fed back to the voltage generator after the driving voltage supplied from the power manager passes through the display panel, wherein the display panel includes a plurality of pixels, wherein at least one of the plurality of pixels includes a light emitting element including a first electrode and a second electrode, the power manager provides the driving voltage to the second electrode of the light emitting element, and the voltage generator receives the feedback driving voltage from the second electrode of the light emitting element.

2. The display device of claim 1, further comprising:

a flexible circuit film electrically connected to the display panel, wherein the voltage generator is disposed on the flexible circuit film.

3. The display device of claim 2, further comprising:

a main circuit board electrically connected to the flexible circuit film, wherein the power manager is disposed on the main circuit board.

4. The display device of claim 3, wherein the flexible circuit film further includes a voltage line, and wherein the initialization voltage is provided to the display panel through the voltage line of the flexible circuit film.

5. The display device of claim 2, further comprising:

a data driving circuit disposed on the flexible circuit film and which provides a data signal to the display panel.

6. The display device of claim 1, wherein the voltage generator includes:

an operational amplifier including a first input terminal connected to a feedback voltage line for receiving the feedback driving voltage, a second input terminal connected to a first node, and an output terminal for outputting the initialization voltage;

a first resistor between the output terminal and the first node; and a second resistor connected between the first node and a ground terminal.

7. The display device of claim 1, wherein the voltage generator includes:

a first resistor connected between a feedback voltage line for receiving the feedback driving voltage and a first node; and a second resistor connected between the first node and a ground terminal, wherein a voltage of the first node is the initialization voltage.

8. The display device of claim 1, wherein the at least one of the plurality of pixels further includes:

an initialization transistor connected between the first electrode of the light emitting element and an initialization voltage line, and wherein the initialization voltage line receives the initialization voltage.

9. The display device of claim 1, wherein the at least one of the plurality of pixels includes:

a first transistor including a first electrode electrically connected to a first voltage line, a second electrode, and a gate electrode;

a second transistor connected between a data line and the first electrode of the first transistor;

a third transistor connected between the second electrode of the first transistor and the gate electrode of the first transistor; and the light emitting element connected between the second electrode of the first transistor and a driving voltage line, wherein the driving voltage line receives the driving voltage.

10. The display device of claim 1, wherein the display panel includes first pixels positioned in a first display area and second pixels positioned in a second display area, wherein the display device further comprises:

a first flexible circuit film electrically connected to the first pixels of the first display area; and a second flexible circuit film electrically connected to the second pixels of the second display area.

11. The display device of claim 10, wherein the voltage generator includes:

a first voltage generator disposed on the first flexible circuit film and which receives a first feedback driving voltage from the first pixels and generates a first initialization voltage; and a second voltage generator disposed on the second flexible circuit film and which receives a second feedback driving voltage from the second pixels and generates a second initialization voltage, wherein the first initialization voltage is provided to the first pixels, and the second initialization voltage is provided to the second pixels, wherein the feedback driving voltage includes the first feedback driving voltage and the second feedback driving voltage, wherein the initialization voltage includes the first initialization voltage and the second initialization voltage.

12. A display device comprising:

a display panel including first pixels positioned in a first display area and second pixels positioned in a second display area;

a power manager, which provides a driving voltage to the first pixels and the second pixels;

a first voltage generator, which receives a first feedback driving voltage from the first pixels and generates a first initialization voltage based on the first feedback driving voltage; and a second voltage generator, which receives a second feedback driving voltage from the second pixels and generates a second initialization voltage based on the second feedback driving voltage, wherein the first voltage generator increases the first initialization voltage when the first feedback driving voltage increases and decreases the first initialization voltage when the first feedback driving voltage decreases, wherein the first initialization voltage is provided to the first pixels, and the second initialization voltage is provided to the second pixels, wherein at least one of the first pixels includes a first light emitting element including a first electrode and a second electrode, the power manager provides the driving voltage to the second electrode of the first light emitting element, and the first voltage generator receives the first feedback driving voltage from the second electrode of the first light emitting element, wherein at least one of the second pixels includes a second light emitting element including a first electrode and a second electrode, the power manager provides the driving voltage to the second electrode of the second light emitting element, and the second voltage generator receives the second feedback driving voltage from the second electrode of the second light emitting element.

13. The display device of claim 12, wherein the first feedback driving voltage is a voltage that is fed back to the first voltage generator after the driving voltage supplied from the power manager passes through the first area of the display panel, and wherein the second feedback driving voltage is a voltage that is fed back to the second voltage generator after the driving voltage supplied from the power manager passes through the second area of the display panel.

14. The display device of claim 12, further comprising:

a first flexible circuit film electrically connected to the first pixels of the first display area; and a second flexible circuit film electrically connected to the second pixels of the second display area.

15. The display device of claim 14, wherein the first voltage generator is positioned on the first flexible circuit film, and the second voltage generator is positioned on the second flexible circuit film.

16. The display device of claim 14, further comprising:

a first data driving circuit positioned on the first flexible circuit film and which provides a first data signal to the first pixels; and a second data driving circuit positioned on the second flexible circuit film and which provides a second data signal to the second pixels.

17. The display device of claim 12, wherein the first voltage generator includes:

a first operational amplifier including a first input terminal connected to a first feedback voltage line for receiving the first feedback driving voltage, a second input terminal connected to a first node, and an output terminal for outputting the first initialization voltage;

a first resistor between the output terminal and the first node; and a second resistor connected between the first node and a ground terminal.

18. The display device of claim 17, wherein the second voltage generator includes:

a second operational amplifier including a first input terminal connected to a second feedback voltage line for receiving the second feedback driving voltage, a second input terminal connected to a second node, and an output terminal for outputting the second initialization voltage;

a third resistor connected between the output terminal and the second node; and a fourth resistor connected between the second node and the ground terminal.

19. The display device of claim 18, wherein the first resistor and the third resistor have different resistance values from each other, and wherein the second resistor and the fourth resistor have different resistance values from each other.

20. The display device of claim 12, wherein a voltage level of the first initialization voltage is lower than or equal to the driving voltage, and wherein a voltage level of the second initialization voltage is lower than or equal to the driving voltage.

* * * * *